(12) United States Patent
Littlejohn et al.

(10) Patent No.: US 10,875,638 B2
(45) Date of Patent: Dec. 29, 2020

(54) DE-ICE FAIRING BOND FIXTURE

(71) Applicant: Sikorsky Aircraft Corporation, Stratford, CT (US)

(72) Inventors: David Littlejohn, Haslet, TX (US); Sven Roy Lofstrom, Irving, TX (US); Scott Oren Smith, Bedford, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 97 days.

(21) Appl. No.: 15/282,263

(22) Filed: Sep. 30, 2016

(65) Prior Publication Data

US 2018/0093761 A1 Apr. 5, 2018

(51) Int. Cl.
| | | |
|---|---|---|
| *B23K 37/04* | (2006.01) | |
| *B64C 27/473* | (2006.01) | |
| *B64F 5/10* | (2017.01) | |
| *B64D 15/00* | (2006.01) | |
| *B64F 5/40* | (2017.01) | |
| *B23K 101/00* | (2006.01) | |
| *B29C 73/24* | (2006.01) | |

(52) U.S. Cl.
CPC ............ *B64C 27/473* (2013.01); *B23K 37/04* (2013.01); *B64D 15/00* (2013.01); *B64F 5/10* (2017.01); *B64F 5/40* (2017.01); *B23K 2101/001* (2018.08); *B29C 73/24* (2013.01)

(58) Field of Classification Search
None
See application file for complete search history.

(56) References Cited

U.S. PATENT DOCUMENTS

| | | | | |
|---|---|---|---|---|
| 3,909,889 A * | 10/1975 | Emerson | ................. | B25B 5/10 24/514 |
| 4,301,982 A * | 11/1981 | Tiemann | ................. | B64C 27/50 244/17.11 |
| 4,747,588 A * | 5/1988 | Dillhoff | ................. | B25B 5/12 269/258 |
| 4,805,351 A * | 2/1989 | Dobson | ................. | B24B 19/14 29/889.7 |
| 4,995,146 A * | 2/1991 | Woods | ................. | B25B 5/003 269/45 |
| 5,105,515 A * | 4/1992 | Nelson | ................. | B25B 5/061 269/910 |
| 5,553,815 A * | 9/1996 | Adams | ................. | B64D 15/163 244/134 R |
| 6,598,866 B2 * | 7/2003 | Helm | ................. | B23Q 1/032 269/21 |
| 6,820,468 B2 * | 11/2004 | Powers | ................. | F01D 25/285 73/432.1 |
| 6,855,033 B2 * | 2/2005 | Jones | ................. | B23Q 3/063 269/238 |

(Continued)

*Primary Examiner* — Devang R Patel
(74) *Attorney, Agent, or Firm* — Foley & Lardner LLP

(57) ABSTRACT

A bond fixture includes a first frame defining a chamber configured to receive a leading edge of a rotor blade and a second frame pivotally coupled to the first frame. The second frame is movable between a first position and a second position. In the second position, the second frame restricts movement of the bond fixture relative to the rotor blade. At least one supporting assembly extends from the first frame towards the chamber. The at least one supporting assembly is adjustable to apply a pressure to an adjacent surface of the rotor blade.

13 Claims, 9 Drawing Sheets

(56) References Cited

U.S. PATENT DOCUMENTS

| | | | | |
|---|---|---|---|---|
| 7,980,522 | B2* | 7/2011 | Anderson | B25B 5/14 |
| | | | | 244/17.11 |
| 8,061,699 | B2* | 11/2011 | Wang | B23Q 3/061 |
| | | | | 269/287 |
| 8,393,062 | B2* | 3/2013 | Alexander | B25B 5/14 |
| | | | | 29/21 |
| 8,409,389 | B2 | 4/2013 | Jones | |
| 8,439,309 | B2* | 5/2013 | Cardell | B64D 15/16 |
| | | | | 244/134 E |
| 9,381,699 | B2 | 7/2016 | Boschet et al. | |
| 9,421,673 | B2* | 8/2016 | Dunmire | B64C 27/006 |
| 2014/0250675 | A1* | 9/2014 | Sherrill | B23Q 3/064 |
| | | | | 29/559 |

* cited by examiner

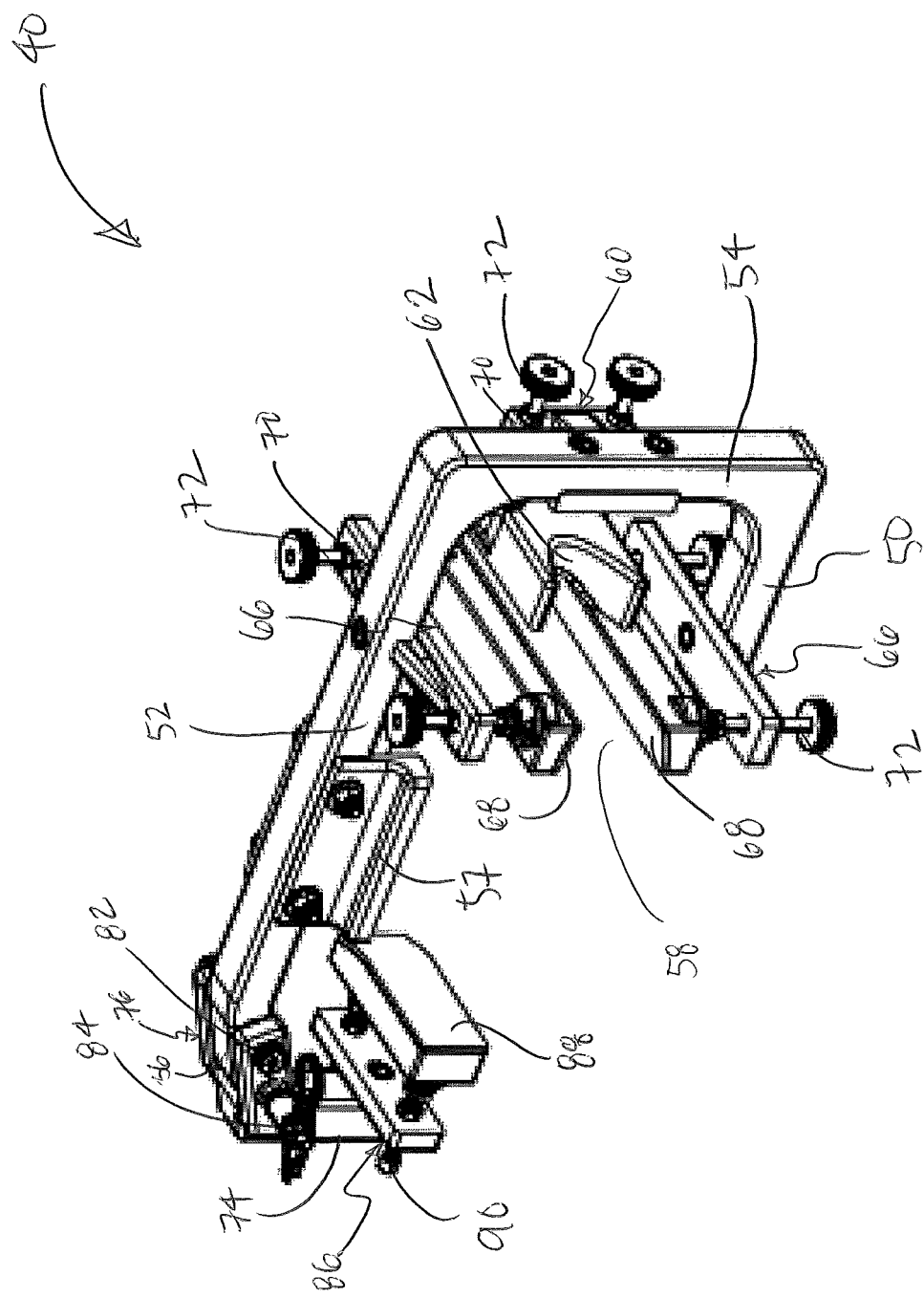

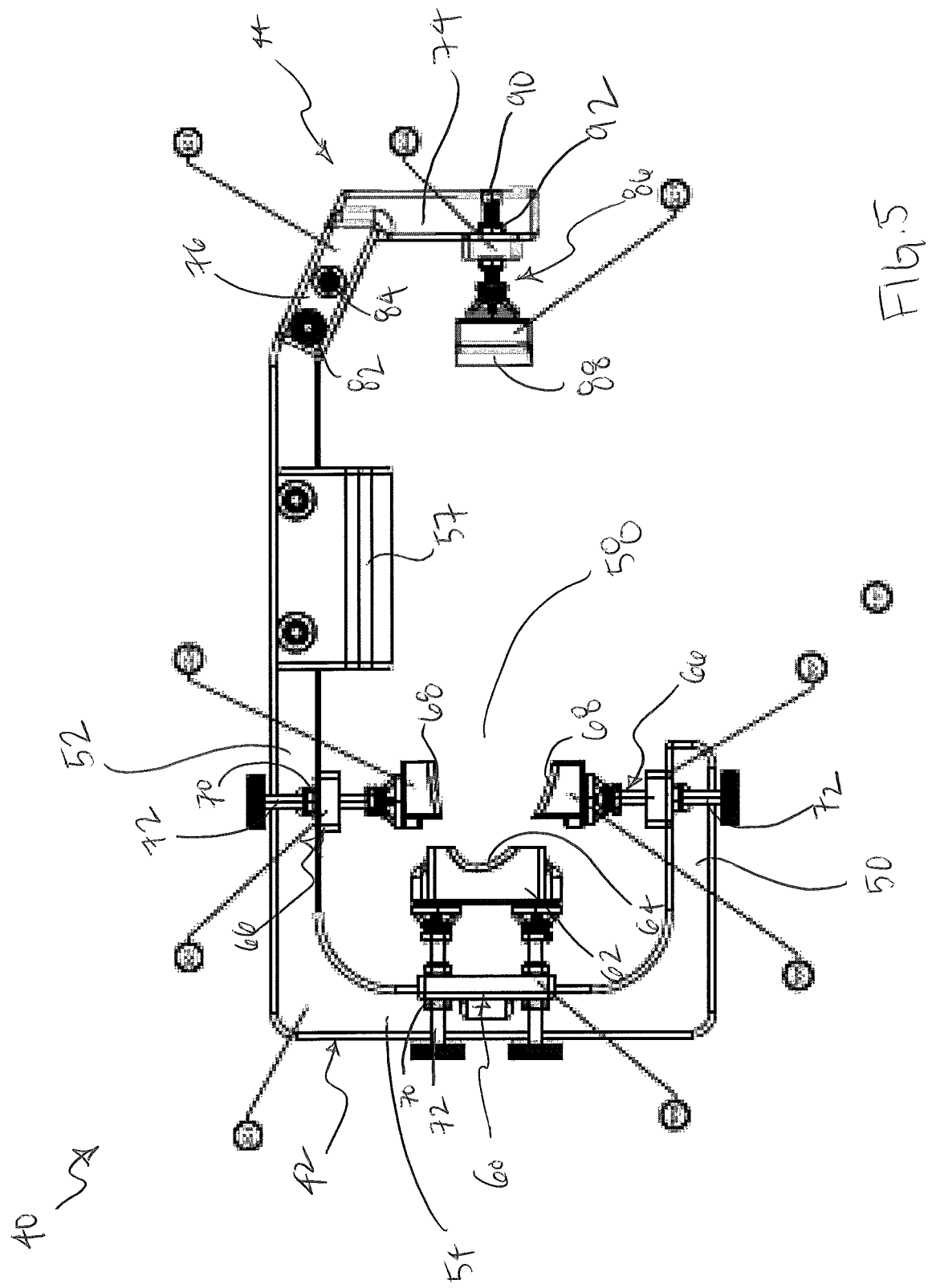

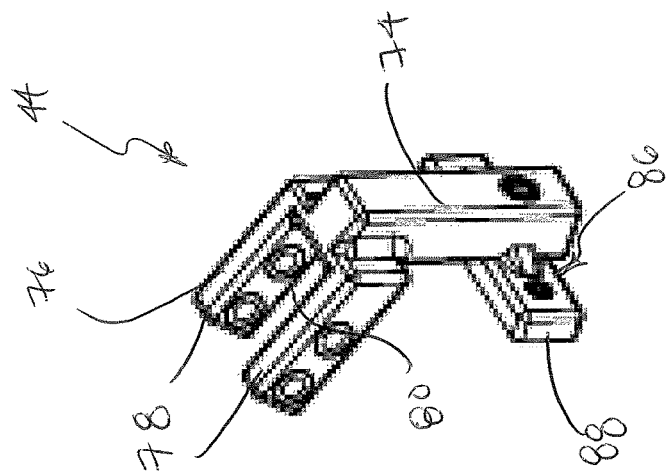
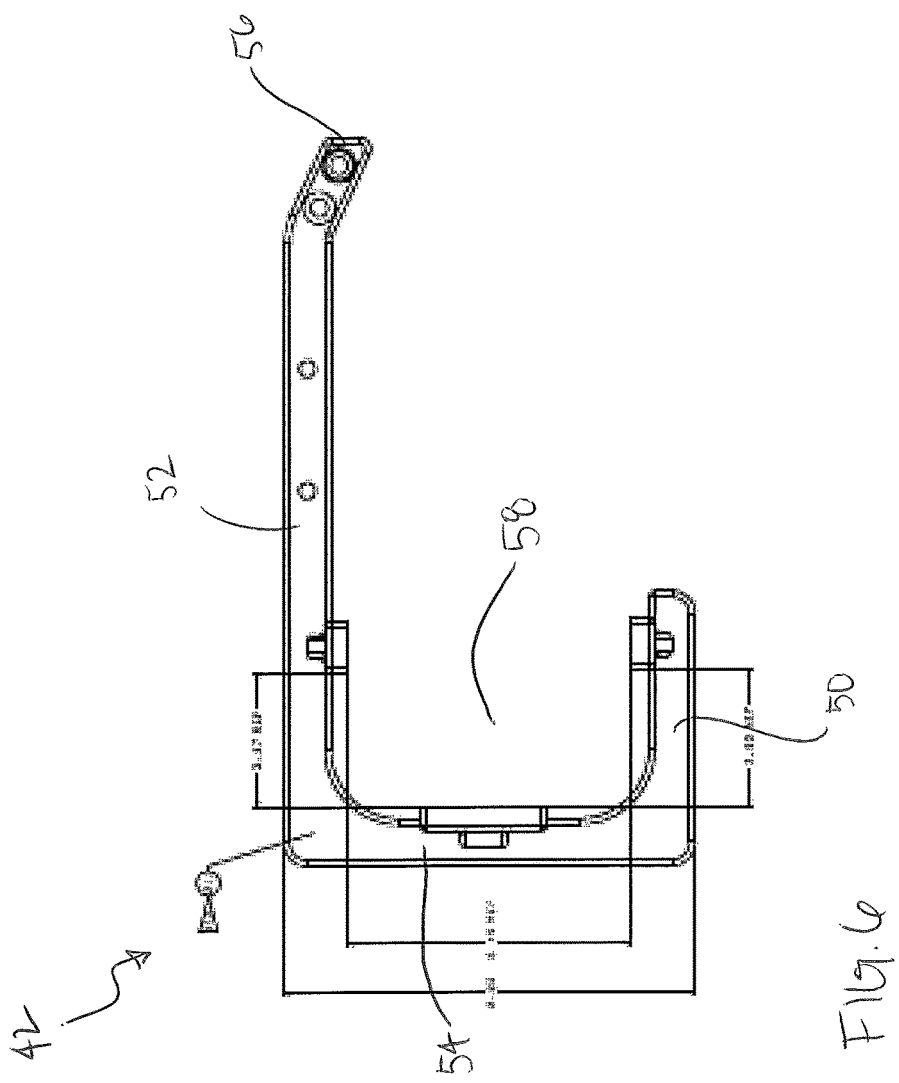

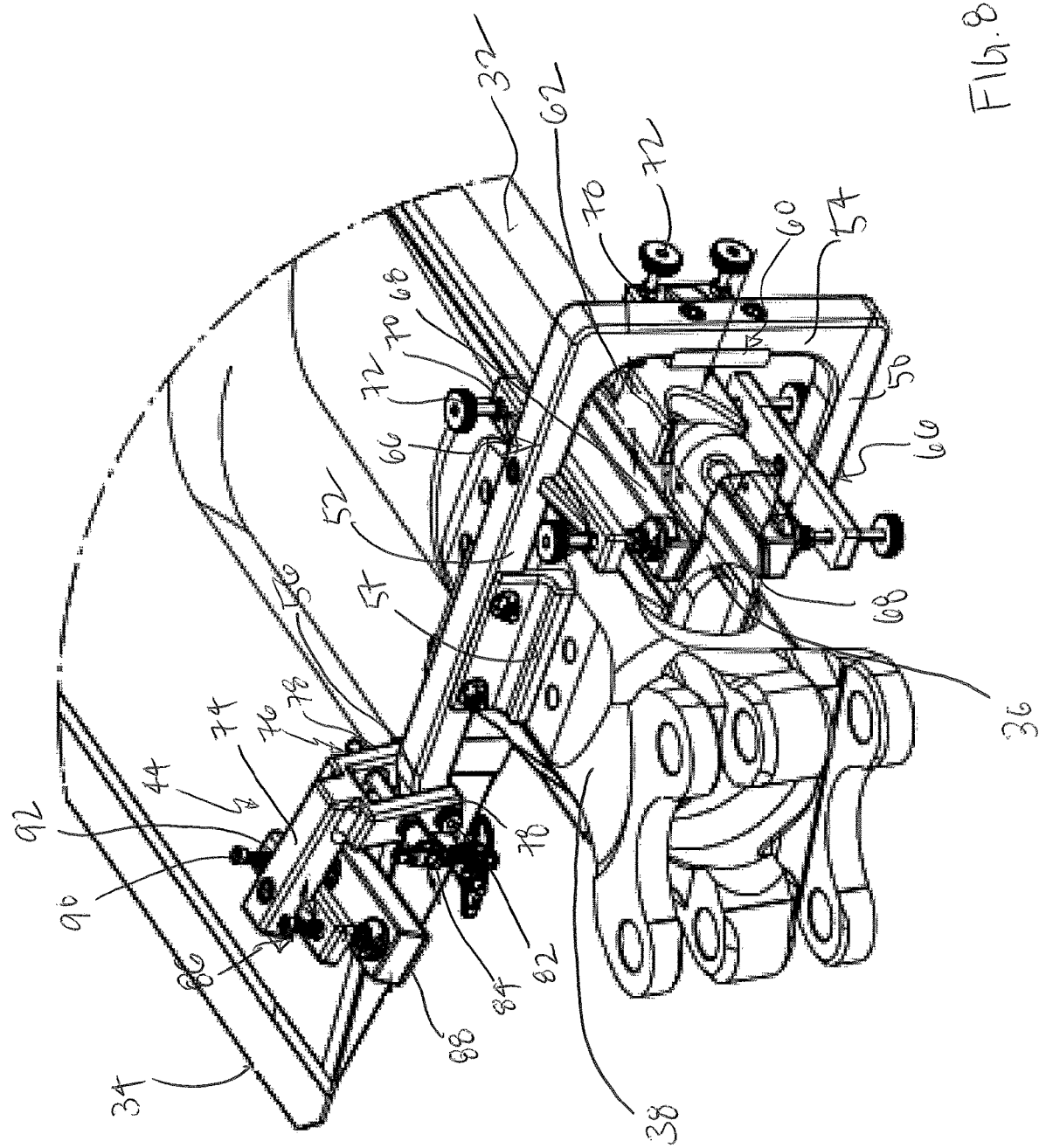

DE-ICE FAIRING BOND FIXTURE

BACKGROUND OF THE INVENTION

Exemplary embodiments of the invention relate to rotary-wing aircraft and, more particularly, to a bond fixture for use during the manufacture or repair of a rotor blade of a rotary-wing aircraft.

Rotary wing aircraft include a plurality of main rotor blades coupled to a central hub. The rotor blades include aerodynamic surfaces that, when rotated, create lift. The configuration of the main rotor blades, particularly the leading edge thereof, is selected to enhance rotor blade performance, for example to increase the hover and lift capabilities of the rotary-wing aircraft. Rotor blades are subjected to high stresses and strains resulting from aerodynamic forces developed during operation.

BRIEF DESCRIPTION OF THE INVENTION

According to one embodiment of the invention, a bond fixture includes a first frame defining a chamber configured to receive a leading edge of a rotor blade and a second frame pivotally coupled to the first frame. The second frame is movable between a first position and a second position. In the second position, the second frame restricts movement of the bond fixture relative to the rotor blade. At least one supporting assembly extends from the first frame towards the chamber. The at least one supporting assembly is adjustable to apply a pressure to an adjacent surface of the rotor blade.

In addition to one or more of the features described above, or as an alternative, in further embodiments the first frame includes a first arm and a second arm coupled by a connecting member.

In addition to one or more of the features described above, or as an alternative, in further embodiments the second frame is pivotally coupled to a distal end of the second arm.

In addition to one or more of the features described above, or as an alternative, in further embodiments a length of the second arm is substantially greater than a length of the first arm.

In addition to one or more of the features described above, or as an alternative, in further embodiments the at least one supporting assembly includes a supporting assembly coupled to the connecting member of the first frame.

In addition to one or more of the features described above, or as an alternative, in further embodiments the supporting assembly coupled to the connecting member includes a pad having a contoured surface complementary to the leading edge of the rotor blade.

In addition to one or more of the features described above, or as an alternative, in further embodiments the at least one supporting assembly includes a pair of supporting assemblies coupled to the first arm and the second arm and extending towards the chamber.

In addition to one or more of the features described above, or as an alternative, in further embodiments the pair of supporting assemblies are substantially aligned.

In addition to one or more of the features described above, or as an alternative, in further embodiments each of the pair of supporting assemblies includes a pad having a contoured surface complementary to an adjacent surface of the rotor blade.

In addition to one or more of the features described above, or as an alternative, in further embodiments wherein a locking mechanism is configured to couple to the first frame and the second frame to lock the second frame in the second position.

In addition to one or more of the features described above, or as an alternative, in further embodiments in the second position, the second frame is configured to contact a blade cuff of the rotor blade.

In addition to one or more of the features described above, or as an alternative, in further embodiments at least one another supporting assembly extends from the second frame towards the chamber, the at least one another supporting assembly including a pad configured to abut a surface of the blade cuff.

According to another embodiment, a method of bonding a de-ice fairing to a rotor blade includes installing the de-ice fairing to the rotor blade and positioning a bond fixture about the rotor blade. The bond fixture includes a first frame and a second frame. The second frame is rotated from a first position to a second position relative to the first frame. At least one supporting assembly of the bond fixture is adjusted to apply a pressure to an adjacent surface of the rotor blade and de-ice fairing. Localized and constant pressure is applied to the de-ice fairing.

In addition to one or more of the features described above, or as an alternative, in further embodiments positioning the bond fixture about the rotor blade includes disposing the leading edge of the rotor blade within a chamber defined by the first frame.

In addition to one or more of the features described above, or as an alternative, in further embodiments rotating the second frame from a first position to a second position includes installing a locking mechanism coupled to the first frame and the second frame to selectively lock the second frame in the second position.

In addition to one or more of the features described above, or as an alternative, in further embodiments the at least one support assembly includes a pad, and the pressure applied by the pad to the rotor blade is adjusted by changing the position of the pad relative to the rotor blade.

In addition to one or more of the features described above, or as an alternative, in further embodiments applying localized and constant pressure to the de-ice fairing includes retaining the bond fixture about the rotor blade for an extended period of time.

In addition to one or more of the features described above, or as an alternative, in further embodiments comprising applying heat to the de-ice fairing during the application of localized and constant pressure.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is another perspective view of a bond assembly for bonding a de-ice fairing to a root end of a rotor blade according to an embodiment;

FIG. 5 is a side view of a bond assembly for bonding a de-ice fairing to a root end of a rotor blade according to an embodiment;

FIG. 6 is a side view of a first frame of a bond assembly for bonding a de-ice fairing to a root end of a rotor blade according to an embodiment;

FIG. 7 is a perspective view of a second frame of a bond assembly for bonding a de-ice fairing to a root end of a rotor blade according to an embodiment;

FIG. 8 is a perspective view of a portion of a bond assembly mounted about a rotor blade according to an embodiment;

FIG. 10 is a method of bonding a de-ice fairing to the root end of the rotor blade according to an embodiment.

The detailed description explains embodiments of the invention, together with advantages and features, by way of example with reference to the drawings.

DETAILED DESCRIPTION OF THE INVENTION

Figure 1:
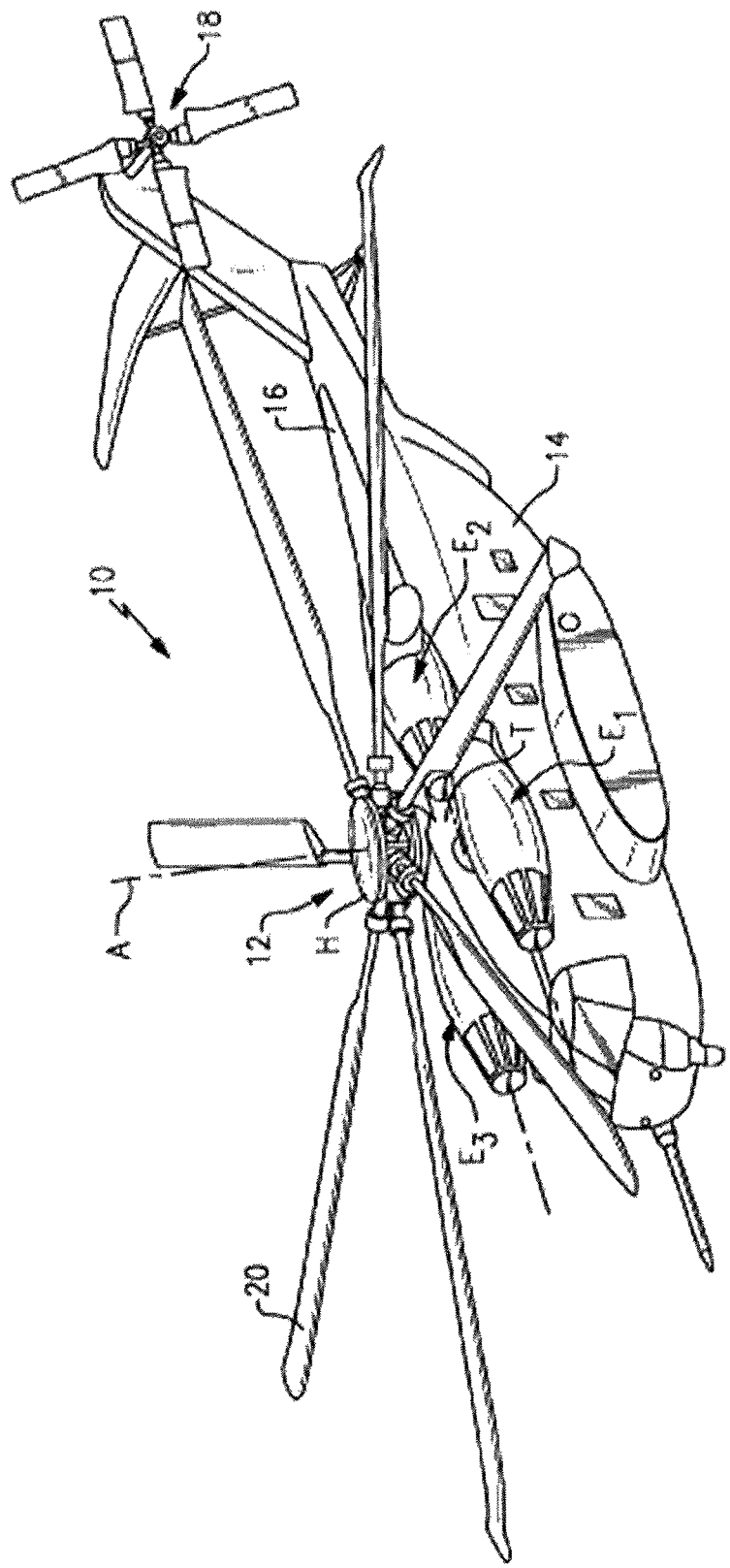
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircraft with supplemental translational thrust systems, dual contra-rotating, coaxial rotor system aircraft, turbo-props, tilt-rotors, and tilt-wing aircraft are also within the scope of the invention.

Figure 2:
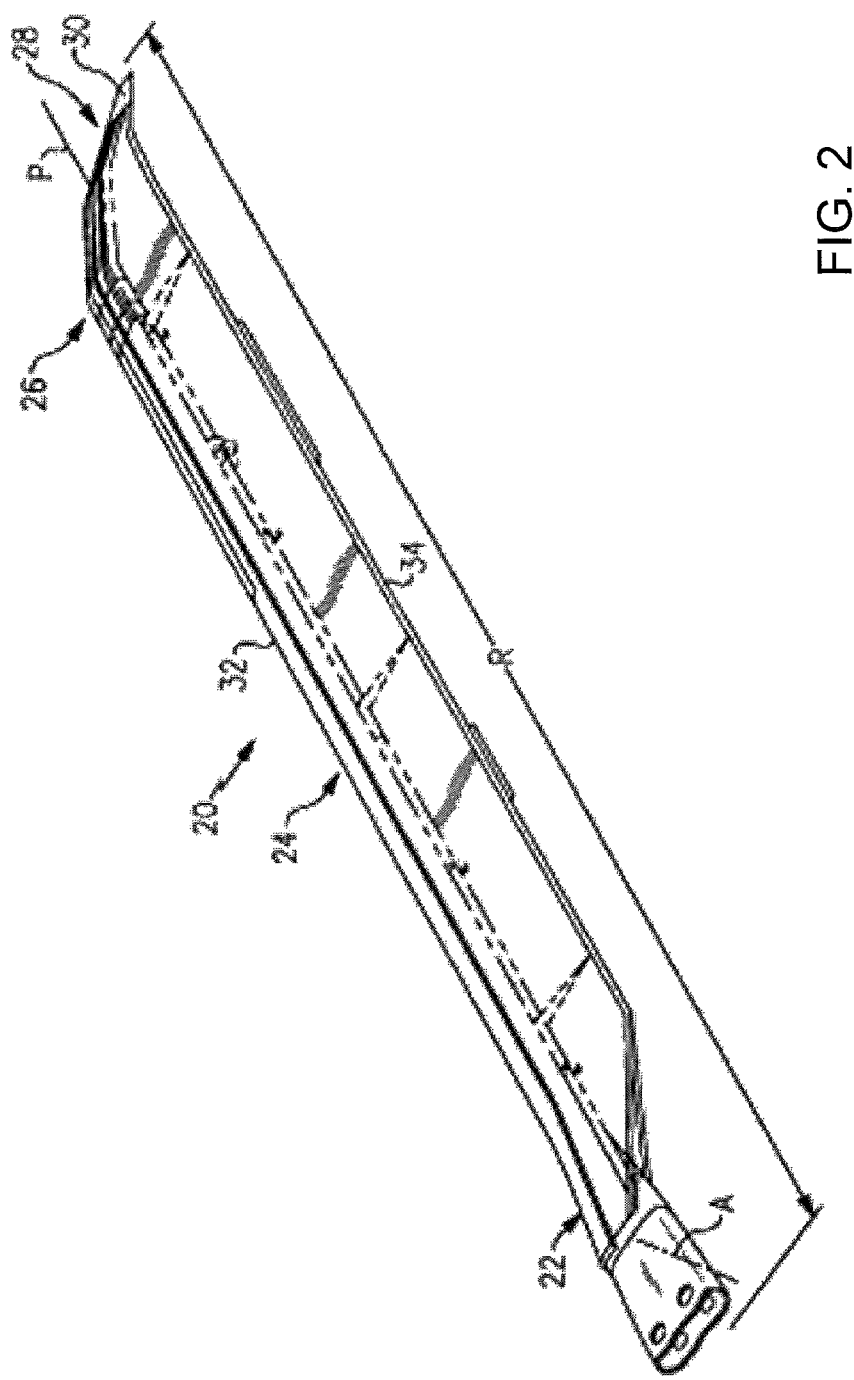
FIG. 2 is a perspective view of an example of a rotor blade of a rotary wing aircraft.
Figure 3:
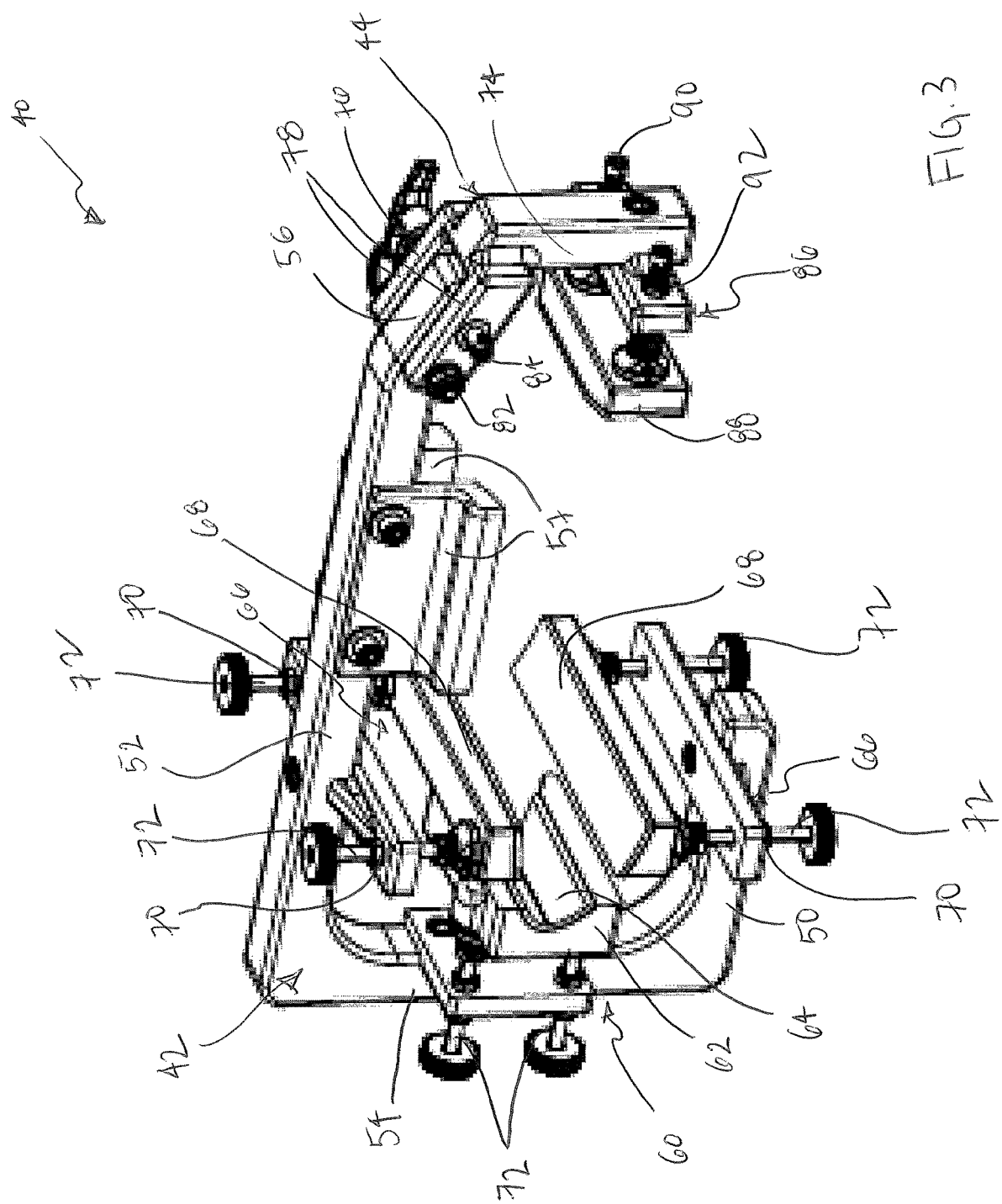
FIG. 3 is a perspective view of a bond assembly for bonding a de-ice fairing to a root end of a rotor blade according to an embodiment.
Figure 9:
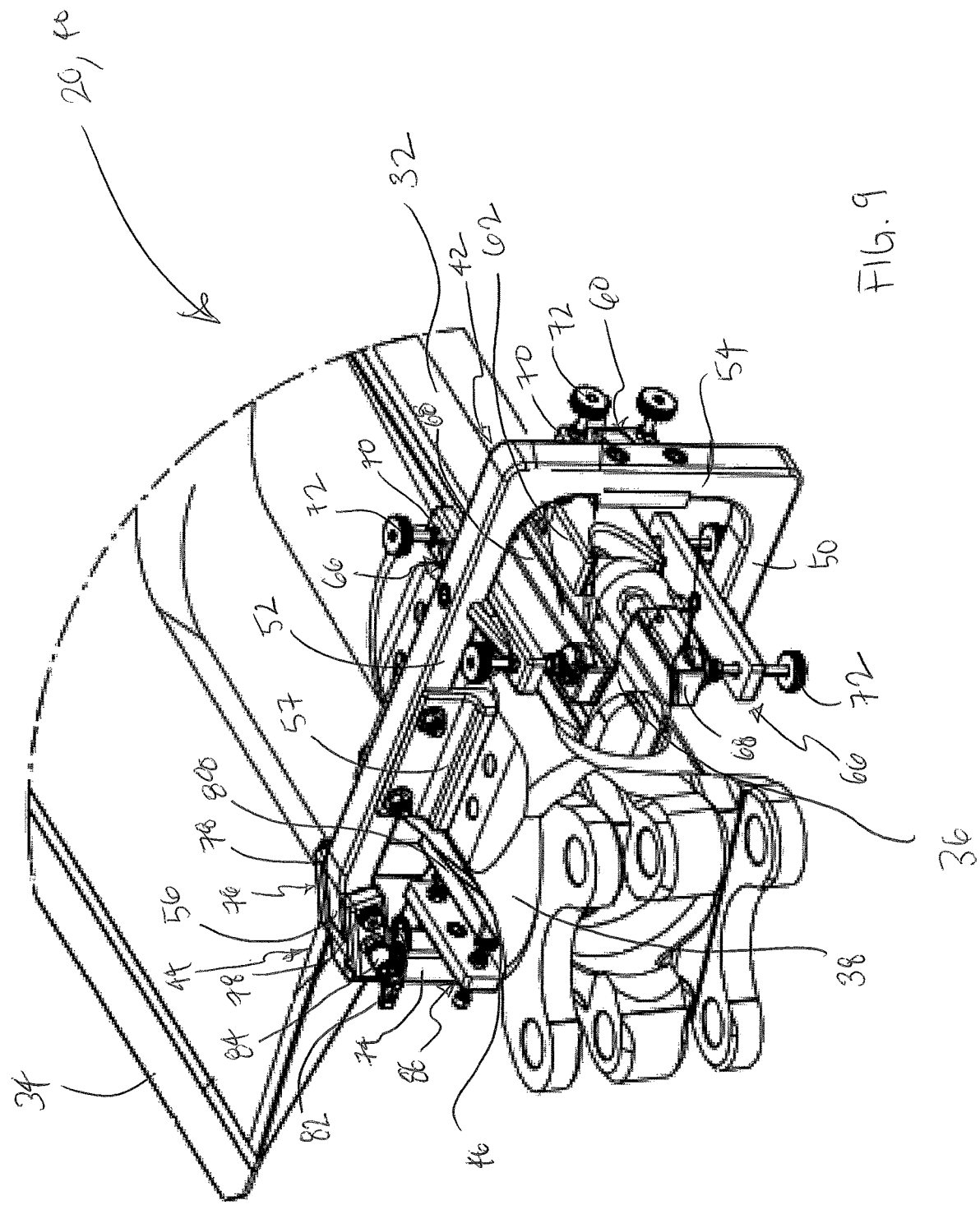
FIG. 9 is a perspective view of the bond assembly mounted about a rotor blade according to an embodiment.
Figure 1D:
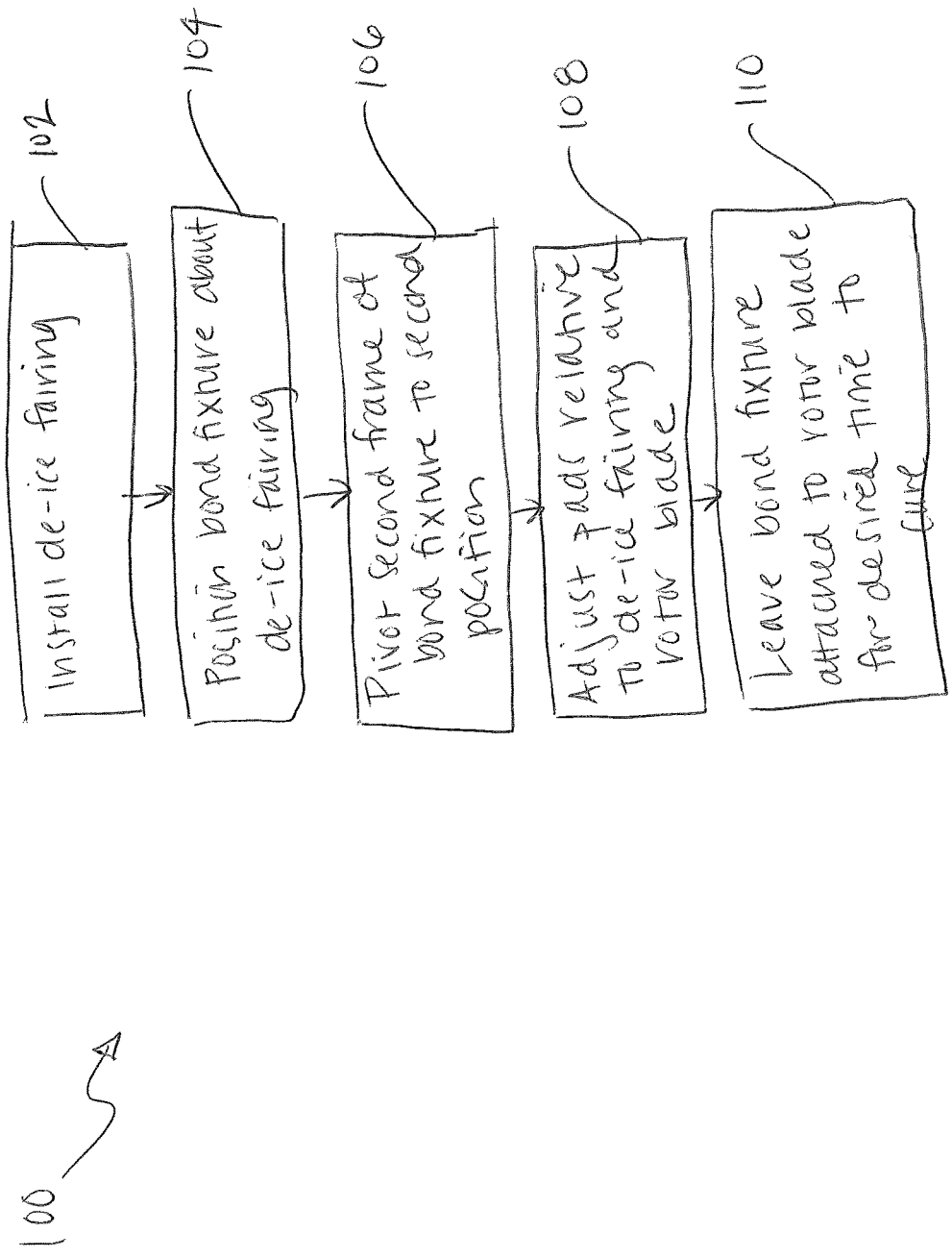

Referring to FIG. 2, each rotor blade assembly 20 of the rotor assembly 12 generally includes a root section 22, an intermediate section 24, a tip section 26, and a tip cap 28. Each rotor blade section 22, 24, 26, 28 may define particular airfoil geometries to tailor the rotor blade aerodynamics to the velocity increase along the rotor blade span. As, illustrated, the rotor blade tip section 26 may include an anhedral form (not shown); however, any angled or non-angled forms such as cathedral, gull, bent, and other non-straight forms are within the scope of the present invention. The anhedral form (not shown) as defined herein may include a rotor blade tip section 26 which extends at least partially out of a plane defined by the intermediate section 24.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. A de-ice fairing 36 is generally bonded to the root end 22 of the rotor blade 20, adjacent the blade cuff 38.

A bond assembly 40 for bonding the de-ice fairing 36 to the rotor blade 20 is illustrated in FIGS. 4-9. The bond assembly 40 includes a first frame 42 configured to mount about the leading edge 32 of the rotor blade 20 and a second frame 44 configured to couple to an opposing surface 46 of the blade cuff 38. The first frame 42 is best shown in FIG. 6 and includes a first arm 50 and a second arm 52 coupled by a connecting member 54. In the illustrated, non-limiting embodiment, the first and second arms 50, 52 are arranged parallel to and opposite one another in a generally aligned manner such that the first and second arms 50, 52 are separated by a distance. The second arm 52 is substantially longer than the first arm 50. For example, the second arm 52 may be sized such that when the bond assembly 40 is attached to a rotor blade 20, the free end 56 of the second arm 52 is arranged near the surface 46 of the blade cuff 38. In an embodiment, one or more L-shaped brackets 57 may extend from a central portion of the second arm 52. When the first frame 42 is mounted to the rotor blade 20, the L-shaped bracket 57 is configured to abut and maintain contact with a portion of the rotor blade 20, such as the blade cuff 38 for example.

The first frame 42 generally defines a chamber 58 within which the rotor blade 20 is positionable. During installation of the bond assembly 40 about a rotor blade 20, the leading edge 32 is disposed generally adjacent the connecting member 54 of the first frame 42. In an embodiment, a first support assembly 60 extends perpendicularly from the connecting member 54 into the chamber 58, such as at an orientation substantially parallel to the first arm 50 and the second arm 52 thereof. The first support assembly 60 may be coupled to or integrally formed with the connecting member 54. Arranged at the distal end of the first support assembly 60 is at least one pad 62 formed from any suitable material, such as rubber or another resilient plastic for example. In the illustrated, non-limiting embodiment, an inlet 64 formed in a surface of the pad 62 has a contour generally complementary to the leading edge 32 of the rotor blade 20. As a result, when the bond assembly 40 is mounted about the rotor blade, the leading edge 32 is disposed within the inlet 64. However, it should be understood that in other embodiments, the inlet 64 may be formed in the connecting member of the first frame.

A pair of second support assemblies 66 extends perpendicularly from the first arm 50 and the second arm 52, respectively, into the chamber 58. The pair of second support assemblies 66 may be located substantially coaxially, as shown in FIG. 5. Each of the second support assemblies 66 may additionally include one or more pads 68 configured to contact an adjacent surface of the rotor blade 20. The exposed surfaces of the pads 68 are generally complementary to the adjacent surface of the rotor blade 20. The second support assemblies 66 cooperate to apply a force to opposing surfaces of the rotor blade 20.

In an embodiment, one or more of the first support assembly 60 and the second support assemblies 66 are movably mounted to the first frame 42. In the illustrated, non-limiting embodiment, a nut 70 is mounted to the first frame 42 adjacent each of the first support assembly 60 and the second support assemblies 66. The assemblies 60, 66 include threaded fasteners 72 engaged with these nuts 70, such that rotation of the threaded fastener 72 may be used to control movement of each of the assemblies 60, 66 individually, relative to the first frame 42. The adjustment of the position of the assemblies 60, 66, and therefore of the first pad 62 and the second pads 68 may be used to control the pressure applied by the plurality of pads 62, 68 to the various surfaces of the rotor blade 20. It should be understood that the threaded fastener 72 and nut 70 described herein to adjust the position of the pads 62, 68 is intended as an example only, and other suitable mechanisms are contemplated herein.

With reference now to FIG. 7, the second frame 44 includes a support 74 and a connector 76. In the illustrated, non-limiting embodiment, the connector 76 extends at an angle to the support 74. The connector 76 is configured to attach the second frame 44 to the distal end 56 of the second arm 52 of the first frame 42. In an embodiment, the connector 76 includes a clevis portion having two generally parallel arms 78 that define an opening 80 within which the free end 56 of the second arm 52 is received. However, other constructions of the connector 76 are also contemplated herein.

A pin or other fastener 82 may be used to couple the first and second frames 42, 44 such that the second frame 44 is rotatable relative to the first frame 42 about an axis defined by the pin or fastener 82. Through this rotation, the second frame 44 is movable between a first position, best shown in FIG. 8, and a second position, best shown in FIG. 9. A second pin or fastener 84 may be used to selectively lock the second frame in one of the first position and the second position. In an embodiment, when the second frame 44 is in the second position, the support 74 is oriented substantially parallel to the connecting member 54 of the first frame 42.

Mounted to the support 74 of the second frame 44 is a third support assembly 86. In an embodiment, the third support assembly 86 is configured to extend generally perpendicular to the support 74 such that when the second frame 44 is in the second position, the third support extends 86 towards the chamber 58 and is substantially parallel to the first arm 50 and the second arm 52 of the first frame 42. The third support assembly 86 may be coupled to or may be integrally formed with the support 74. At least one pad 88 is positioned at the distal end of the third support assembly 86.

When the second frame 44 is in the second position, the at least one pad 88 is configured to contact a surface 46 of the blade cuff 38 closest to the trailing edge 34 of the rotor blade 20. The third support assembly 86 may be fixedly attached or may be movably mounted to the support 74 of the second frame 44. In the illustrated, non-limiting embodiment, a threaded fastener 90 and nut 92 may cooperate to control the position, and therefore the pressure, applied by the third support assembly 86 to the blade cuff 38.

With reference now to FIG. 10, a method of bonding a de-ice fairing to the root end of the rotor blade 20 includes installing the de-ice fairing via a dry fit about the leading edge of the rotor blade 20, as shown in block 102. In an embodiment, installation of the de-ice fairing includes masking the outer surfaces of the de-ice fairing in a known manner. In block 104, the bond fixture 40 is positioned about the de-ice fairing. Positioning of the bond fixture 40 includes locating the leading edge of the rotor blade 20 within the chamber 58 defined by the first frame 42. In addition, when the bond fixture 40 is positioned about the de-ice fairing, the second frame 44 is in the first position, such that the second frame 44 is rotated vertically to provide a clearance to insert the rotor blade into the bond fixture 40. The second frame 44 is then pivoted and locked in the second position, as shown in block 106, such that the support 74 of the second frame 44 is generally parallel to the adjacent surface 46 of the blade cuff 38.

In block 108, the plurality of pads 62, 68 associated with the first frame 42 may be movably adjusted to apply a desired pressure to the bond line of the de-ice fairing and the rotor blade 20. In an embodiment, the pads 62, 68 are adjusted by rotating the corresponding fasteners 72 of the first and second support assemblies 60, 66 via hand or another tool. When in the second position, the engagement between the second frame 44 and the blade cuff 38 is intended to restrict movement of the bond fixture 40 relative to the rotor blade 20, for example due to the pressure applied by the pads 60, 68 to the leading edge of the rotor blade 20. Once the pads 62, 68 are adjusted to apply a desired pressure, the bond fixture 40 is left in place attached to the rotor blade 20 for an extended length of time, such as 24 hours for example, as shown in block 110. The de-ice fairing may be maintained at room temperature, or alternatively, may be heated during the application of pressure by the bond fixture 40. For example, in an embodiment, heating elements may be associated with the pressure pads to accelerate the adhesive cure cycle.

The bond assembly 40 illustrated and described herein provides localized pressure to a desired area of the rotor blade, specifically to the root end where the de-ice fairing is located. The small size of the bond assembly 40 allows the bonding process to be performed in a fixed location and during both the manufacture of a new rotor blade 20 and the repair of an existing rotor blade 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A bond fixture comprising:
   a first frame including a connecting member, a first arm, and a second arm, the first arm and the second arm are oriented generally parallel to one another and extend from opposing ends of the connecting member, an axial length of the second arm is greater than an axial length of the first arm and a distal end of the second arm is arranged at an angle to the first arm, wherein a chamber configured to receive a leading edge of a rotor blade is defined between the first arm, a portion of the second arm overlapping the first arm, and the connecting member;
   a second frame including a support movably coupled to the distal end of the second arm, the second frame being movable between a first position and a second position, wherein in the second position, the support is arranged external to said chamber and is oriented generally parallel to the connecting member; and
   at least one supporting assembly extending from the first frame towards the chamber, the at least one supporting assembly being movable relative to the first frame to apply a pressure to an adjacent surface of the rotor blade, wherein the at least one supporting assembly includes a supporting assembly extending from the connecting member into the chamber.

2. The bond fixture according to claim 1, wherein the second frame is pivotally coupled to the distal end of the second arm.

3. The bond fixture according to claim 2, wherein a length of the second arm is substantially greater than a length of the first arm.

4. The bond fixture according to claim 1, wherein the at least one supporting assembly includes a supporting assembly coupled to the connecting member of the first frame.

5. The bond fixture according to claim 4, wherein the supporting assembly coupled to the connecting member includes a pad having a contoured surface complementary to the leading edge of the rotor blade.

6. The bond fixture according to claim 1, wherein the at least one supporting assembly includes a pair of supporting assemblies coupled to the first arm and the second arm and extending towards the chamber.

7. The bond fixture according to claim 6, wherein the pair of supporting assemblies are substantially aligned.

8. The bond fixture according to claim 6, wherein each of the pair of supporting assemblies includes a pad having a contoured surface complementary to an adjacent surface of the rotor blade.

9. The bond fixture according to claim 1, wherein a locking mechanism is configured to couple to the first frame and the second frame to lock the second frame in the second position.

10. The bond fixture according to claim 1, wherein in the second position, the second frame is configured to contact a blade cuff of the rotor blade.

11. The bond fixture according to claim 10, wherein at least one another supporting assembly extends from the second frame towards the chamber, the at least one another supporting assembly including a pad configured to about a surface of the blade cuff.

12. The bond fixture according to claim 1, further comprising a heating element associated with at least one of the first frame and the second frame.

13. A bond fixture comprising:
   a first frame including a connecting member, a first arm, and a second arm, the first arm and the second arm are oriented generally parallel to one another and extend from opposing ends of the connecting member, an axial length of the second arm is greater than an axial length of the first arm and a distal end of the second arm is arranged at an angle to the first arm, wherein a chamber configured to receive a leading edge of a rotor blade is defined between the first arm, a portion of the second arm overlapping the first arm, and the connecting member;
   a second frame including a support coupled to the first frame, the second frame being movable relative to the first frame, wherein the second frame is movable to a position such that the support is arranged external to said chamber and is oriented generally parallel to the connecting member; and
   at least one supporting assembly extending from the first frame, wherein the at least one support assembly includes a supporting assembly extending from the connecting member into the chamber, the at least one supporting assembly being movable relative to the first frame to apply a pressure to the rotor blade, wherein the bond fixture is operable to bond a de-ice fairing to a rotor blade via:
   installing the de-ice fairing to the rotor blade;
   positioning the bond fixture about the rotor blade;
   rotating the second frame relative to the first frame;
   adjusting the at least one supporting assembly to apply pressure to a surface of the rotor blade and de-ice fairing; and
   applying localized and constant pressure to the de-ice fairing.

* * * * *